March 18, 1969   D. S. JOHNSTON   3,433,647
PROCESS FOR PRODUCING FISH STEAKS
Original Filed Oct. 8, 1962
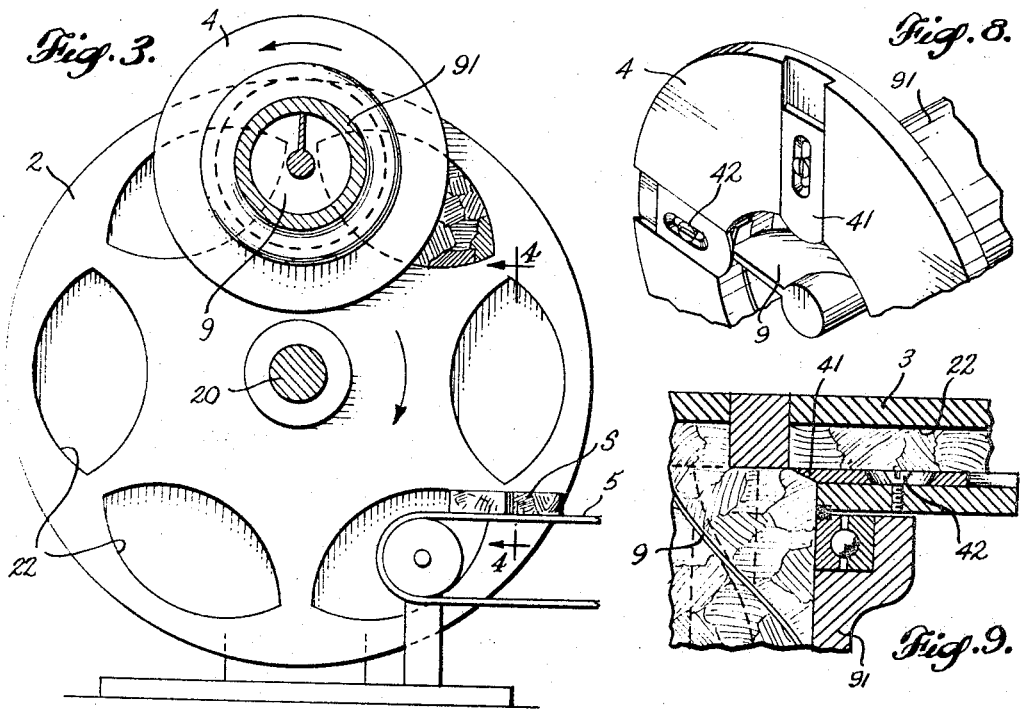
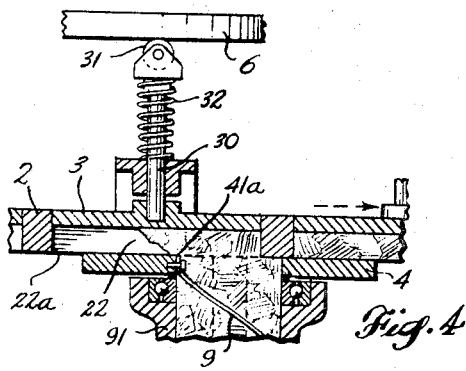
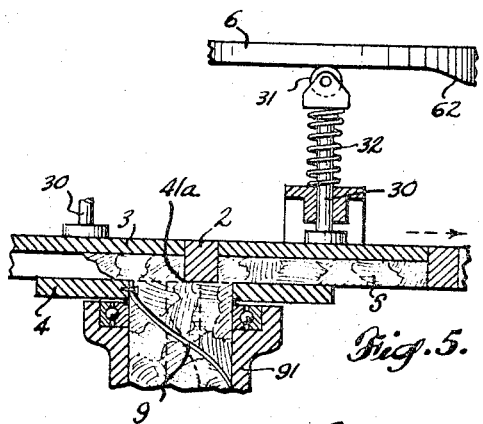
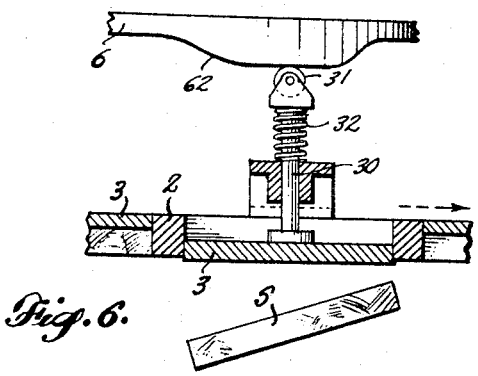
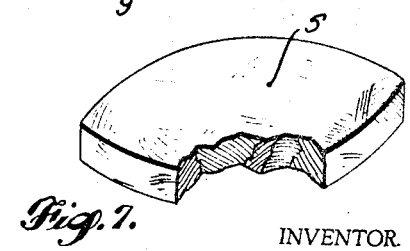
INVENTOR.
DONALD S. JOHNSTON
BY
ATTORNEYS United States Patent Office 3,433,647
Patented Mar. 18, 1969

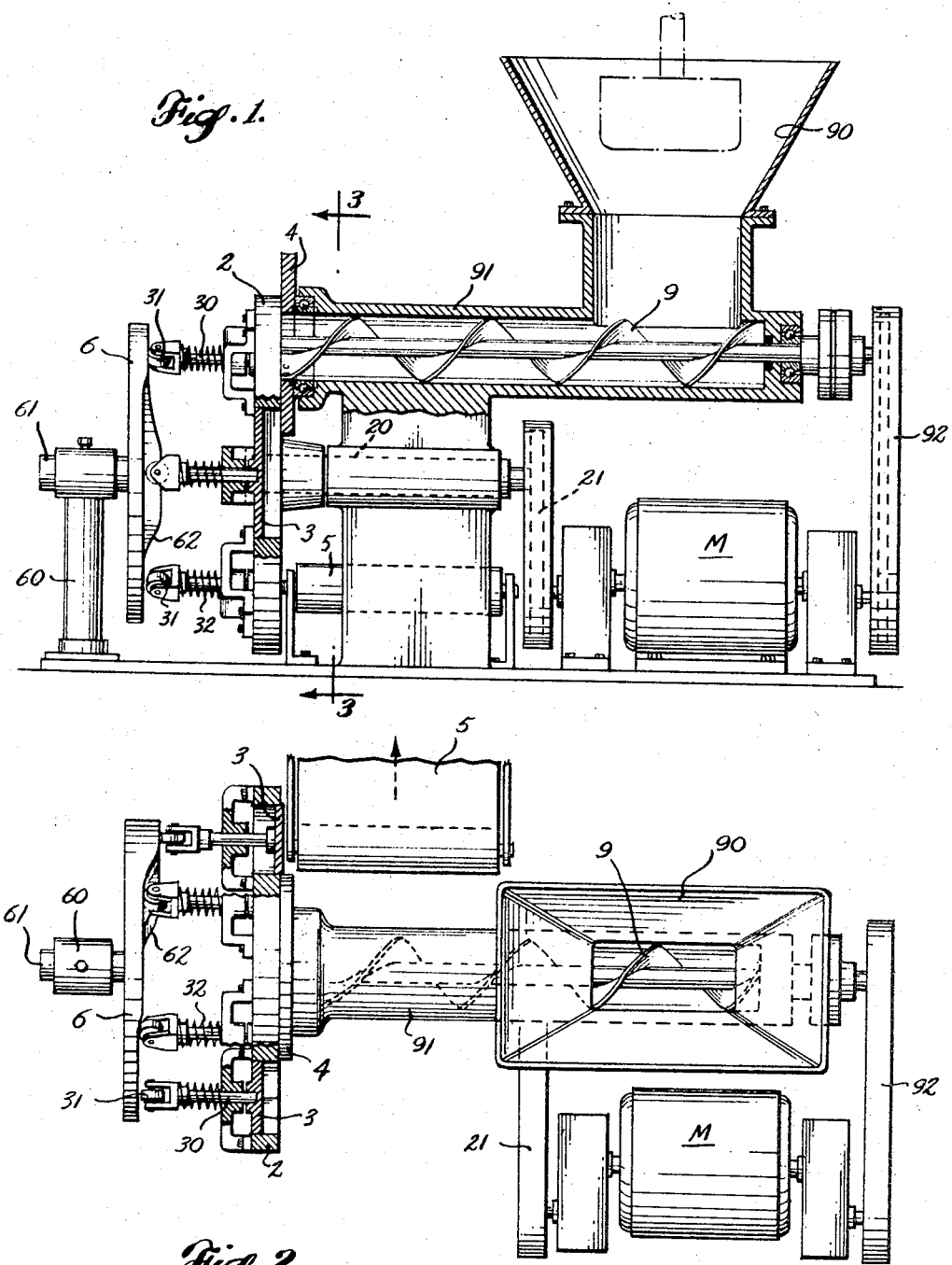

3,433,647
PROCESS FOR PRODUCING FISH STEAKS
Donald S. Johnston, 10141 SE. 8th St.,
Bellevue, Wash. 98004
Original application Oct. 8, 1962, Ser. No. 229,020, now Patent No. 3,230,579, dated Jan. 25, 1966. Divided and this application July 14, 1965, Ser. No. 471,966
U.S. Cl. 99—111     5 Claims
Int. Cl. A22c 25/06, 25/00

ABSTRACT OF THE DISCLOSURE

A novel fish steak and a method of forming the same are disclosed. The fish steak comprises an eatable body consisting essentially of fresh chunks of fish fayed together in a tightly formed mass of the same which is integrally fused so as to be form-sustaining. In making the steak, whole chunks of the fish are charged into a cavity in the face of a mold while a flat-surfaced, sharp-edged shear plate is relatively moved across the mouth of the cavity, so as to fill the cavity with a tight mass of the chunks having a flattened surface at the mouth thereof. In addition, the mold and the shear plate are relatively shifted in a path crosswise of their course of relative movement, so as to plane the surface of the plate over the surface of the mass while the chunks are fusing into an integral body, for discharge from the mold.

---

This application is a division of Ser. No. 229,020, filed Oct. 8, 1962, now Patent No. 3,230,579.

The present application concerns, broadly speaking, the manufacture of novel fish products in the form of fish steaks composed of chunks or strips (i.e. whole pieces each of appreciable size) of fresh fish adhering one to another, and arranged in a standard outline, and each of a standard thickness, size, and weight ready for cooking by frying or otherwise, to constitute individual portions.

Fish cakes have been made of ground or shredded fish, but such comminuted product loses much of the moisture, the flavor, and the nutrients which accompany the moisture, and so the fish cakes made of such material are of somewhat inferior quality. Moreover, they have no appreciable tendency toward cohesion, and tend to revert to shreds during handling and cooking. By this invention steaks are made of chunks or strips of fish such, for instance, as may be made up from fillets and portions of fillets, the chunks being pressed together and overlapped so that they tend to adhere one to another, and while thus compressed in a column are cut or sliced off cleanly, one by one, from the column in measured quantities. In the process of their severance from the column they are lapped one over another, and pressed together, this procedure being termed herein "polishing," and when discharged they tend to remain in the form of a standard steak composed of a number of such cohesive chunks. Such steaks are suitable for freezing and storage or for direct marketing and use. They simplify packaging and merchandising by weight and size, are highly nutritive and possess most of the flavor and much of the smooth textural qualities of the original fillets.

Because of the nature of this product, it is necessary to sever each steak cleanly from the column in a manner that will maintain a given plane of severance, to the end that the steak, when severed from the column, is maintained in its predetermined shape and size, with all chunks tending to cohere one with the others in an individual steak of a standard size and weight, such as a steak suitable for an individual serving.

In producing fish cakes with the machine of this invention, whole pieces of fish are pressed into a mold cavity so as to fill the cavity to a predetermined depth under pressure sufficient to cause substantially uniform density of material throughout the cavity and cohesion between the pieces, but which pressure is insufficient to destroy the tissue structure within the pieces or to extrude natural juices from the flesh, and thereby impair its nutritional value and destroy its flavor characteristics. In the preferred and illustrated practice of the method, these pieces are fed en masse as a column, are advanced into the mold cavity under pressure, and finally are sheared off at the mold face while under such pressure, and while being subjected to a lateral "polishing" action which tends to lap one chunk over another and to insure their cohesion. Subsequent ejection of the molded product prepares the mold for subsequent reuse, whereby under rapid production conditions, the process may be conducted on a continuous basis.

The disclosed molding machine for producing the described fish cakes according to the process of this invention incorporates a succession of mold cavities moved progressively across the discharge end of the feed tube or duct through which the column of fish pieces being fed under pressure against the cavity are guided. As a mold cavity moves progressively into and from registry with the duct, the chunks flow somewhat plastically as the cavity is filled, and its contents are bonded together under pressure sufficiently to remain intact as a molded steak after severance and upon ejection from the cavity. A dry member, characterizing the invention, is interposed between the mold cavity and the duct. This dry member or shear plate, as it is herein termed, rotates continuously about an axis defining the direction of feed, and serves both to sever the column of fish at the entrance to the mold cavity, and to polish or smooth the steak at the cavity face as the cavity is being filled and advanced beyond the discharge end of the duct. Such polishing or smoothing action, effected by the shear plate, works or spreads the surface materials of the different pieces or chunks across the surfaces of the neighboring pieces, and thereby further integrates the mass into a cohesive whole.

The accompanying drawings show the invention in a representative form, the drawings of the machine showing a preferred form, and the drawing of the steak showing a typical form.

FIGURE 1 is in part a side elevational view and in part a sectional view axially of the feed worm, illustrating the machine.

FIGURE 2 is a plan view of the machine, with parts broken away.

FIGURE 3 is a transverse sectional view, on an enlarged scale, taken substantially at the line 3—3 of FIGURE 1.

FIGURES 4, 5 and 6 are detail sectional views illustrating successive steps in the formation, severance and delivery of a fish steak by the machine of this invention, the views being in the nature of sections at the line 4—4 of FIGURE 3, but with the rotative mold plate either approximately in registry with the shear plate and the feed tube, or in FIGURE 6 wholly beyond the same.

FIGURE 7 is an isometric view, partly broken away, to show the internal composition of an individual steak.

FIGURE 8 is an isometric view of a detail of a shear plate with separable knives, which constitutes a modified form of this portion of the machine, and FIGURE 9 is a view similar to FIGURE 4, but on a larger scale, showing such knives in the process of severing a steak from the column.

In general, the machine includes a tube and means to force chunks of fish through the same, such as a worm rotative therein, to advance heterogeneous chunks of fish (the term "chunk" being used herein to include pieces, strips, etc. of material size) in a substantially homogeneous column from a feed hopper toward a delivery point at the opposite end of the tube, at which delivery point the column of material flows en masse, plastically into a mold cavity repeatedly registering with the tube's delivery end, such as successive mold cavities in a mold plate that revolves past the delivery end of the tube. Differing from prior machines, and according to the present invention, the material in a mold cavity is severed from the colmun not by the revolution or other movement of the mold plate with relation to the end of the fixed feed tube, but by a shearing or severing plate, which may or may not be fitted with knives, that is rotatable about the delivery point of the tube and with relation to the column of material exiting from the tube. This effects clean severance of the chunky material, and tends to "polish" or smooth the molded steak, minimizes tearing or displacement forces within the molded product tending to disturb adherence of the pieces to one another, and in fact urges the pieces into better overlapping and cohesive relation. After revolution of the mold plate from registry with the feed tube, ejector means are operated to eject the severed steak from the mold cavity and to convey it away to be wrapped, or to be frozen, or to be cooked immediately. Primarily, it is the employment of the shear plate at the fixed location and rotative about the axis of the delivery end of the feed tube which distinguishes the present invention in its mechanical aspects.

As shown in the drawings, the material, in the form of chunks or strips each of appreciable size, is fed into a hopper 90 and thence into one end of a feed tube 91, and is advanced along the tube by means such as the feed worm 9 rotated from a motor M by suitable drive means indicated at 92. While there may be some severance of the chunks by the feed worm 9, for the most part the worm tends to lay them one upon another, and they tend to remain in chunky or strip form as the column of chunks is advanced lengthwise of the tube 91 toward its delivery end at the left in FIGURES 1 and 2. Adjacent the delivery end of the tube 91, a mold plate 2 is revoluble about an axis defined by the shaft 20, also driven from the motor M by suitable means indicated generally at 21. The axis of revolution is offset from the axis of the tube 91 and worm 9, and the mold plate is formed with mold cavities 22 (see FIGURE 3) in such position that as the disk 2 revolves the cavities will successively come into registry with the discharge end of the tube 91 and will receive the material at the end of the column compressed within the tube 91. Since the column is formed of chunks or pieces, the material will tend to flow plastically into and to fill fully the successive mold cavities 22, but to remain as a tight mass of chunks, as it is seen doing in FIGURES 4 and 5. Each such cavity 22 is closed at the end distant from the tube 91 by an ejector 3, which will be described in greater detail hereinafter, which limits the depth of the mold cavity and, consequently, the amount of material that can be forced into the same.

Reliance is not placed upon the relative movement between the revolving mold plate 2 and the end of the fixedly positioned tube 91 for effecting severance of the molded steak from the column. Instead, intermediate the revolving disk or mold plate 2 and the delivery end of the tube 91 a shear plate 4 is rotatively mounted. Preferably, this is fixed to the end of the worm 9 and is rotated by the worm. The severing edges may be no more than the edge 22a of the mold cavity 22, cooperating with the edge 41a of the shear plate, or there may be knives 41 as shown in FIGURES 8 and 9, which are mounted in the shear plate 4, with sharpened edges projecting into the central aperture thereof and adjustable in and out by the bolt and slot means indicated at 42. While a plain shear plate corner such as 22a is preferred and will operate effectively, either such means, when rotated about the axis of the tube 91, will sever the extruded column of fish chunks cleanly, leaving each mold cavity completely filled with chunks defining an individual steak, and this will be carried from registry with the tube 91 by revolution of the mold plate 2, and at the appropriate place in its revolution the ejector 3 will be moved in the axial direction to eject the steak, which may then fall upon an off-bearing belt 5 to be carried to a place for further processing or for use. The rotation of the shear plate 4 over the surface of the severed or partially severed steak within each mold cavity tends to polish and flatten the steak, and to urge its component chunks together. It also tends to work the surface layers of the fresh fish pieces together and further enchances the physical cohesiveness of the pieces.

As a means for effecting ejecting movement of the ejectors 3, a stationary circular cam 6 is supported coaxially of the mold plate 2, but spaced in the axial direction from the latter. It may be supported upon a standard 60 which supports a stub shaft 61 of the cam 6, and the cam is provided with a rise 62 positioned to engage cam followers 31 upon the end of posts 30, which project from the ejectors 3, to urge the ejectors in the direction shown at the top of FIGURE 2 to effect ejection of a steak received within the mold cavity. Springs 32 return the ejectors 3, after they pass beyond the rise 62, to their position for admitting chunks of fish, and the cam will serve to prevent further retrograde movement of the ejectors. It will be seen that the ejectors 3 are individual each to a particular mold cavity, and that they revolve with the mold plate 2. The depth of the cavities can be varied by shifting the stub shaft 61 axially relative to its standard 60.

The separate knives of the type shown in FIGURES 8 and 9 permit the cutting of a steak closer to or farther from the center of the mold cavity. They also may be removed and sharpened when necessary. The shear plate face in which these knives are set by grooving of the plate is otherwise flat and the knives are held by countersunk screws having head faces flush with the face of the plate and of the knives.

As has already been indicated, the material in the form of chunks, such as are represented in FIGURES 4, 5 and 9, is delivered into the hopper 90 and is advanced by the worm feed 9 towards the left-hand end of the tube 91, and in the process the chunks are compacted and pressed together within the tube. At the delivery end of the tube, as a mold cavity 22 begins to register with the tube 91, the chunks of material flow plastically into mold cavity 22, as is represented in FIGURE 4 at the left. All this time the shear plate 4 is rotating with the worm and tends to sever the material which has entered the mold cavity from the column which is pressing into the cavity, and is polishing already severed steaks or portions thereof. Eventually, the revolution of the mold plate 2 carries a given cavity out of registry with the tube 91, and by this time the rotating shear plate 4 has completed severance, polishing and working of the surface layer of materials together, leaving the cavity filled with a rather homogeneous flat steak of any given peripheral contour, corresponding to the contour of its cavity, and with at least one planar face, that which has just been smoothly severed. The opposite face, if desired, might be molded by suitable shaping of the contacting face of the ejector, but is usually flat and parallel to the severed face. After revolution of the mold plate has carried the steak to the discharge point, as at the line 4—4 in FIGURE 3, the ejector moves forward, ejects the steak S, and it falls upon the off-bearing belt 5 and is carried out of the way before the next steak in ejected.

As will be evident, equal angular spacing between the mold cavities 22 in the mold plate and the cavities of equal size are desirable where the feed screw is driven at a constant rate so as to advance the fish into the successive mold cavities uniformly and with substantially constant density.

The clean severance effected by the rotative shear plate 4 maintains the fish within the individual steaks in the form of chunks, and these chunks tend to adhere one to another. In consequence, the steaks, all of the same weight and shape, may be individually wrapped, or may be frozen in the form in which they were severed from the mass, or may be immediately cooked and consumed. In FIGURE 7 it has been attempted to show a steak S as composed of individual chunks. These chunks, being pieces of fish of appreciable size, contain the greater part of the moisture and the flavor, for the pressure to which they have been subjected is insufficient to break down their tissues, or to squeeze from them the juices, and so they still contain the nutriment which is characteristic of the particular fish, and are not lacking in these characteristics as a fish cake of shredded fish. They require no binder to hold them together in handling or cooking, for all constituent chunks have been pressed sufficiently tightly together.

I claim as my invention:

1. A method of making fish steaks comprising charging whole fresh chunks of fish through an opening between two sections of a flat-surfaced shear plate, into a cavity in the face of a mold, while relatively moving the mold cavity across the opening from the edge of one plate section to the next, to fill the cavity with a mass of chunks having a flattened surface at the mouth thereof, and while relatively shifting the plate sections in paths crosswise to the course of relative movement of the cavity, to layer one chunk over another within the mass, and thereby insure the cohesiveness thereof.

2. The method according to claim 1 wherein the cavity is filled with the mass of chunks by forcefully advancing a column of the same through the opening while moving the mouth of the cavity across the forward end of the column.

3. The method according to claim 1 wherein the mold cavity is relatively moved across the opening by rotating the mold in relation thereto.

4. The method according to claim 3 wherein the shear plate is annular in form and the plate sections are relatively shifted in paths crosswise to the course of movement of the cavity by rotating the shear plate in relation to the mold.

5. The method according to claim 1 wherein the mass of chunks is subsequently displaced from the cavity while maintaining the flat-surfaced condition thereof.

References Cited

UNITED STATES PATENTS

| | | | |
|---|---|---|---|
| 1,864,285 | 6/1932 | Taylor | 99—195 |
| 2,724,651 | 11/1955 | Hampton et al. | 99—195 |
| 2,840,121 | 6/1958 | Carruthers | 99—188 X |
| 2,851,367 | 9/1958 | Heen | 99—195 |
| 2,926,095 | 2/1960 | Gorby | 99—188 |
| 3,137,029 | 6/1964 | De Zolt | 17—32 |

LIONEL M. SHAPIRO, *Primary Examiner.*

U.S. Cl. X.R.

17—32; 99—188; 141—164